INVENTORS:
WILLIAM A. SCHEUBLEIN JR.
BY LOUIS P. FISTER

Gravely, Lieder & Woodruff
ATTORNEYS.

United States Patent Office 3,524,664
Patented Aug. 18, 1970

1

3,524,664
BALL JOINT AND OVERLOAD RELEASE
William A. Scheublein, Jr., Ballwin, and Louis P. Fister, St. Louis, Mo., assignors to Moog Industries, Inc., St. Louis, Mo., a corporation of Missouri
Filed July 15, 1968, Ser. No. 744,899
Int. Cl. B25g 3/38
U.S. Cl. 287—87                                   7 Claims

ABSTRACT OF THE DISCLOSURE

An adjustable type ball joint for connecting two relatively movable parts and embodying an arrangement of wear take-up elements which automatically compensate for wear and manufacturing tolerance, and operate to prevent internal loads in excess of a predetermined value so as not to stress the ball joint beyond a safe load point.

---

This invention relates to ball joints of improved construction in which service wear is automatically adjusted and overloading from adjustment is prevented.

The problems encountered in manufacturing automatically adjustable ball joints include difficulty in final factory adjustment of obtaining uniform stud pull and torque readings due to accumulated tolerance factors in the several parts of the assembly, compensation for lack of uniform resiliency in the operating components which cause high torque loadings, and difficulty in handling high strength materials which possess high friction coefficients sufficient to cause internal overloading and danger of stressing the assembly beyond safe limits. There is also a problem of ball joints being subjected in service to constantly changing loads in tension and compression which may damage some of the components of the automatic adjustment assembly.

An important object of this invention is to provide a ball joint with novel, unique and simple means to protect against high stress and overloading.

Another important object of this invention is to overcome the above enumerated problems in a simple and certain manner.

It is also an object of this invention to provide a ball joint in which the components thereof are able to compensate for manufacturing tolerances and guard against internal overloading.

Other and further objects of this invention are to provide a ball joint or movable joint device within the concept of the movable joint device set forth in the prior application of Scheublein and Fister, Ser. No. 511,609, filed Dec. 6, 1965, and now Pat. No. 3,401,962, but in which novel structure is arranged to prevent overload stress and to compensate for production tolerances.

Certain preferred forms of ball joints are to be described herein, and each thereof incorporates automatic wear compensating means which is free to rotate and float within the housing, and such compensating means is operatively mounted to respond to abnormal service loads for the purpose of limiting further wear take-up until the abnormal loads have subsided. More specifically the preferred ball joint is composed of a housing carrying a load transmitting stud which may rotate and oscillate in the housing, and wear compensating means in the housing in position to engage the stud and automatically adjust out looseness due to wear. The wear compensating means is operatively retained in condition to perform its wear take-up function so long as a predetermined maximum loading is not exceeded, but upon the maximum loading being reached the compensating means is caused to cease functioning, thereby protecting the ball joint against overload.

2

Other objects of this invention will be more particularly set forth in the following description of the parts and components shown in the accompanying drawings, wherein:

FIG. 3 is a greatly enlarged fragmentary sectional view taken at line 3—3 in FIG. 2;

FIG. 6 is a sectional view of a modified element for any of the assemblies shown.

Figure 1:
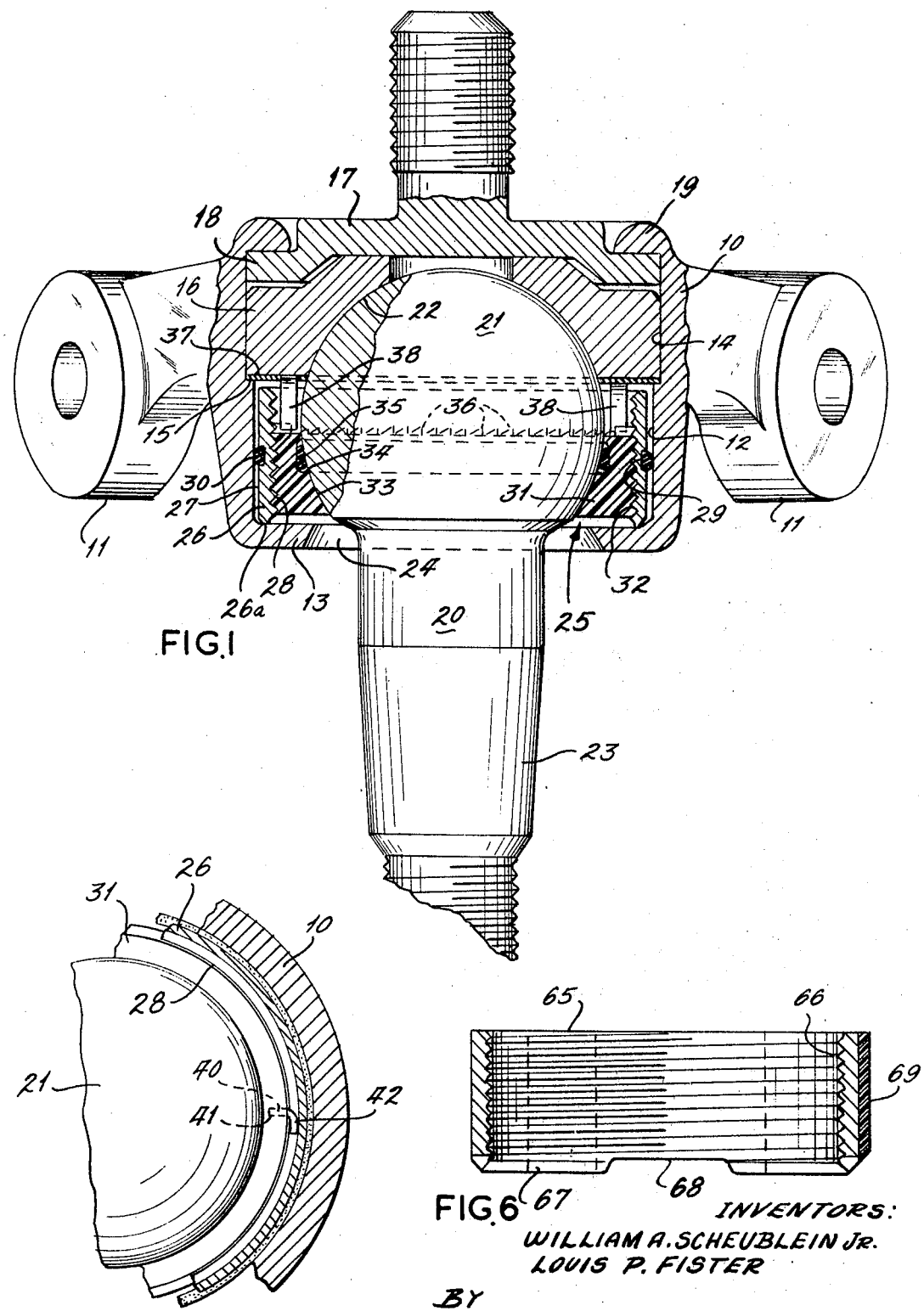
FIG. 1 is a vertical view partly in section, of one form of ball joint embodying the features of this invention.

In the ball joint assembly of FIG. 1, a housing member 10 is provided with projecting lugs 11 by which it may be secured to one part, such as the control arm, (not shown) of a vehicle steerable wheel suspension. The housing 10 defines an internal socket having a reduced diameter bore 12 adjacent an end wall 13, and an enlarged diameter bore 14 adjacent the opposite end. The different diameter bores 12 and 14 provide an annular shoulder 15 upon which is seated a bearing block 16. The bearing block 16 is secured in the bore 14 by a cover member 17 having an annular lipe 18 engaged under the closure lip 19 that is spun over in known manner.

A stud 20 is formed with an enlarged or spherical head 21 seated in the housing against a substantially matching semi-spherical seat surface 22 in the bearing block 16. The stud 20 has its shank 23 projecting out of the housing through an enlarged opening 24 in the wall 13. It can be appreciated that the stud 20 is normally intended to rotate and oscillate against the seat 22 in the bearing block 16, and the shank 23 may be connected to another part of the wheel suspension, such as the steerable wheel spindle bracket (not shown), which is movable relative to the housing 10. The assembly of the stud 20 in the present ball joint is such that its normal loading is in compression which holds the stud head 21 against its seat 22.

The reduced diameter bore 12 in the housing 10 provides an annular space surrounding the stud head 21 and between the block 16 and the end wall 13. This space is utilized to receive a wear compensating and overload protective device 25. The device 25 includes an annular ring element 26 having an outer cylindrical surface 27 that is loose in the bore 12, and its inner surface is provided with suitable threads 28. The ring element 26 is of less length than the distance from the inner surface of the end wall 13 to the under side of the bearing block 16 so that there is vertical play of the ring element 26 in the housing. However, the ring is normally intended to abut the end wall 13 by its end 26a. The outer surface 27 of the ring element 26 is formed with an annular recess 29 to receive an O ring element 30. The element 30 is partly compressed into the recess 29 so that substantial frictional resistance or drag is developed between it and the bore 12 to retain the ring against rotating. A novel feature is that ring element 26 may shift laterally in the bore 12 without materially altering the friction holding force of the O ring element 30.

The device 25 also includes a second annular ring element 31 having suitable threads 32 on its outer surface to engage the threads 28 of the ring 26. The inner surface 33 of the element 31 is semi-spherically formed to engage the stud head 21, and an annular recess 34 is formed in the surface 33 to retain a second O ring 35 under compression by the stud head 21. The upper edge of the ring element 31 is formed with ratchet teeth 36 encircling the stud head 21 as shown, and cooperating therewith is a ratchet ring element 37 having a planar body clamped by its periphery on the shoulder 15 by the bearing block 16 so it is held against rotation. The ratchet ring body is provided with at least two resilient fingers 38 which are struck down from the planar body and engage with the ratchet teeth 36. The fingers 38 and teeth 36 are suitably formed and arranged to prevent the ring element 31 threading itself on the ring element 26 in a direction toward the housing end wall 13, thereby unseating the surface 33 from the stud head 21.

The normal and intended operation of the device 25 in the ball joint of FIG. 1 is to obtain a sufficient amount of friction between the surface 33 on the inner ring element 31 and the surface of the stud head 21, augmented by the friction contact of the O ring 35 on the stud head, to cause the element 31 to turn with the stud head 21 in a direction such that the ring element 31 threads upwardly against the underside of the stud head 21 and presses the head against the bearing block surface 22 only as required to take-up looseness. Concurrently, the outer ring element 26 is held against rotation by the O ring 30 and the lower end 26a thereof abuts the end wall 13. Thus the threads 28 on the ring 26 react with the threads 32 on the ring 31 to achieve the axial movement of the latter ring 31. Of course, the ratchet fingers 38 allow rotation of the ring 31 in only an upward axial direction as viewed in FIG. 1, and the resilient character of the fingers 38 will yield as the ring 31 moves.

An advantage of the organization of parts in FIG. 1 resides in the ability of the rings 26 and 31 to shift laterally in the housing bore 12 to compensate for eccentricities of manufacture of the stud head 21 and the seat 22 in the bearing block 16. Accordingly, the stud head 21 will not bind or stick in the bearing block 16 during rotation or oscillation in service. Also an advantage of the device 25 is that should the loading increase the friction in the elements 26 and 31 high enough, the friction holding element 26 stationary will be exceeded and element 26 will turn with the stud 20 to prevent internal overloading of the assembly.

The operation of the ball joint assembly of FIG. 1 is as follows: Upon initial assembly the element 26 is held by the O ring 30, but element 31 and the stud head 21 are loose in the housing. By tensioning the stud 20 enough friction reaction at O ring 35 is obtained to cause the element 31 to rotate with the stud head 21. It is understood that ring element 26 is prevented from turning because the initial friction reaction of O ring 30 on the bore 12 is purposely high enough to obtain this result. The stud head rotation will cause element 31 to thread on the element 26, and its direction of axial movement will be limited by the ratchet fingers 38 and teeth 36 to the direction to press the stud head 20 into seat 22 in the bearing block 16. The initial looseness adjustment is taken up because the O ring 35 produces sufficient friction reaction to overcome the friction reaction in the threads 28 and 32 and cause the element 31 to follow the stud head. Looseness is taken up when the O ring 35 is squashed and the surface 33 of element 31 is engaged with the stud head 21. At this time the O ring friction reaction has reached a maximum, and further increases in friction relation between element 31 and stud head 21 is due to the surface to surface loading at surface 33. As the loading at surface 33 builds up it causes a reaction loading in the threads 28 and 32 which at some loading exceeds the loading at surface 33, and when this occurs the element 31 is held against turning with the stud head 21 in the adjusting direction and the stud head merely slips on surface 33.

Figure 5:
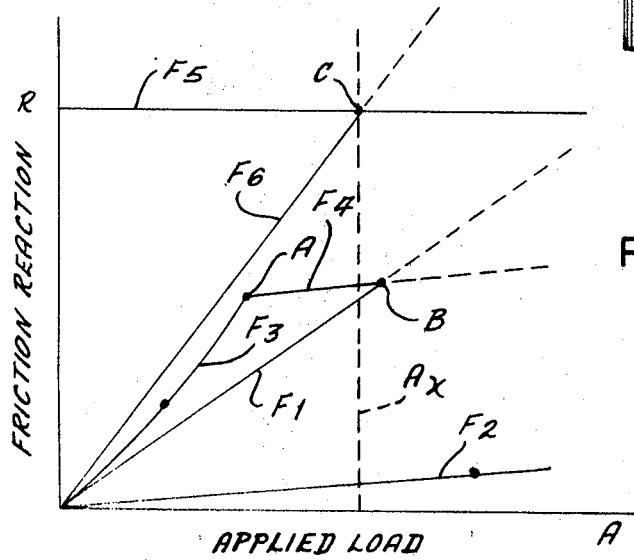
FIG. 5 is a graph illustrating the operating principles of the disclosed ball joint structures.

The foregoing explanation is illustrated by the graph of FIG. 5 which relates applied loading on the abscissa A and friction reaction R on the ordinate. In the graph the lines represent reaction or drag forces in terms of load applied on the ball joint from external sources. Thus, $F_1$ is the friction reaction curve for the threads 28 and 32 and is linearly proportional to load. $F_2$ is the curve representing the friction reaction between the stud head 21 and the surface 33 of the inner element 31, and is also generally a linear relationship. $F_3$ is the curve representing the friction reaction between just the O ring 35 and the stud head 21 and because the O ring is resilient, its friction reaction is variable but is generally proportional to the loading. The friction reaction of O ring 35 eventually reaches a maximum at point A when it is fully squashed in the recess 34 and surface 33 engages the stud head. Thereafter added loading is reflected in a smaller friction reaction along the line $F_4$ which is the total of $F_2$ and $F_3$. When the curves $F_1$ and $F_4$ intersect, as at point B, the stud head 21 will not be loose in the housing 10 because the element 31 will have taken up looseness. The interplay of the elements 26 and 31 on the stud head 21 occurs at point B so that when looseness occurs the reaction follows on curve $F_4$. To adjust out looseness the element 31 must be allowed to rotate relative to element 26 and this is depicted by the curve $F_4$ being greater in friction reaction than curve $F_1$ at any given applied load $Ax$. After looseness is corrected the curves $F_1$ and $F_4$ cross and the element 31 is held by the element 26 against rotation.

In the disclosure of application Ser. No. 511,609 above identified, the element 26 was mechanically held or clamped or was an integral part of the housing of the ball joint. In this disclosure the element 26 is initially loose in the housing to the extent it can shift laterally and axially as needed to compensate for production tolerances, but element 26 is restrained from rotating by being subject to the friction reaction of a high and nearly constant value represented by curve $F_5$. The value of curve $F_5$ is selected to be greater than the value of the friction reaction reached near point B. The freedom of movement available to element 26 is utilized herein to handle unwanted friction reactions within the ball joint that could or would destroy the ball joint if not checked. The unwanted friction reaction is represented by curve $F_6$ and is not considered harmful until it reaches the curve $F_5$ at point C. An eccentric condition between the stud head and element 31 could cause the element 31 to stick to the stud head, in which event the elements 26 and 31 would keep on adjusting with the increase of applied load. This condition is depicted by the curve $F_6$ and at the intersection point C with curve $F_5$ the friction reaction of the O ring 30 is exceeded and element 26 begins to turn with the element 31 to stop adjustment. While the normal operating range of the ball joint is along curve $F_4$ and around point B, unwanted friction reactions are sensed by the O ring 30 and damage to the ball joint is prevented. In other words, when friction forces ($F_6$) are producing higher torque than the friction reaction forces ($F_1$) due to eccentricity, high friction coefficient between element 31 and the stud head, and a contact angle of the surface 33 on the stud head, the device 25 will adjust until $F_6$ reaches point C. At point C the sum of the friction forces $F_6$ will be equal to the friction force $F_5$ will release element 26 for rotation relative to the housing 10 in the direction permitted by the ratchet fingers 38.

Figure 2:
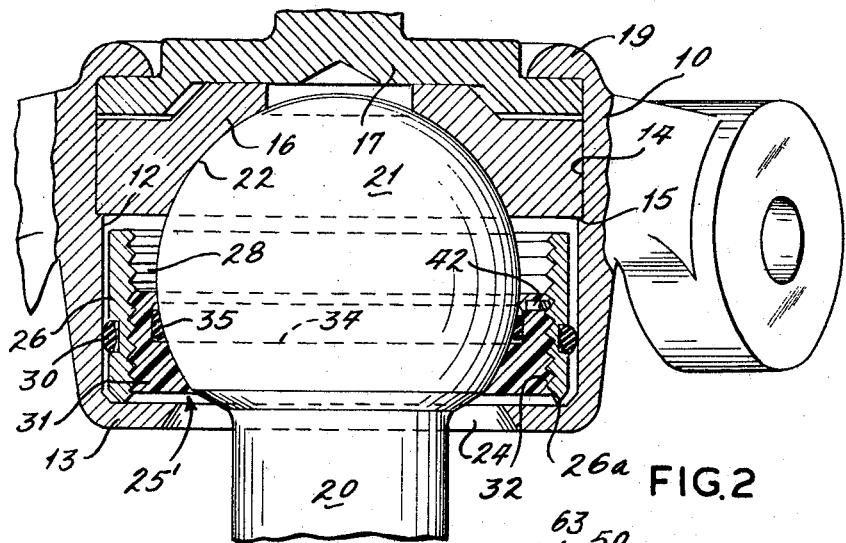
FIG. 2 is a fragmentary and partly sectional view of another form of ball joint incorporating the features of the invention.

In FIG. 2 the housing 10 and stud 20 are similar to the parts of FIG. 1 and are assembled in like manner. The adjusting device 25' in this assembly is made up of parts similar to those shown in FIG. 1, except that the ratchet teeth 36 and fingers 38 are eliminated. In their place the device 25' incorporates a single ratchet element 40 (FIG. 3) mounted radially in a socket 41 formed in the inner element 31 with an extension 42 directed angularly to lie in a groove of threads 28. The extension 42 slides in the threads 28 during movement of element 31 in one direction and prevents reverse movement of element 31. A device of this character is disclosed and claimed in the prior application of Scheublein and Fister, Ser. No. 587,165, filed Oct. 17, 1966.

The operation of the ball joint of FIGS. 2 and 3 follows that set forth herein for the ball joint shown in FIG. 1, and the several components are constructed to practice the teachings of the graph of FIG. 5.

Figure 4:
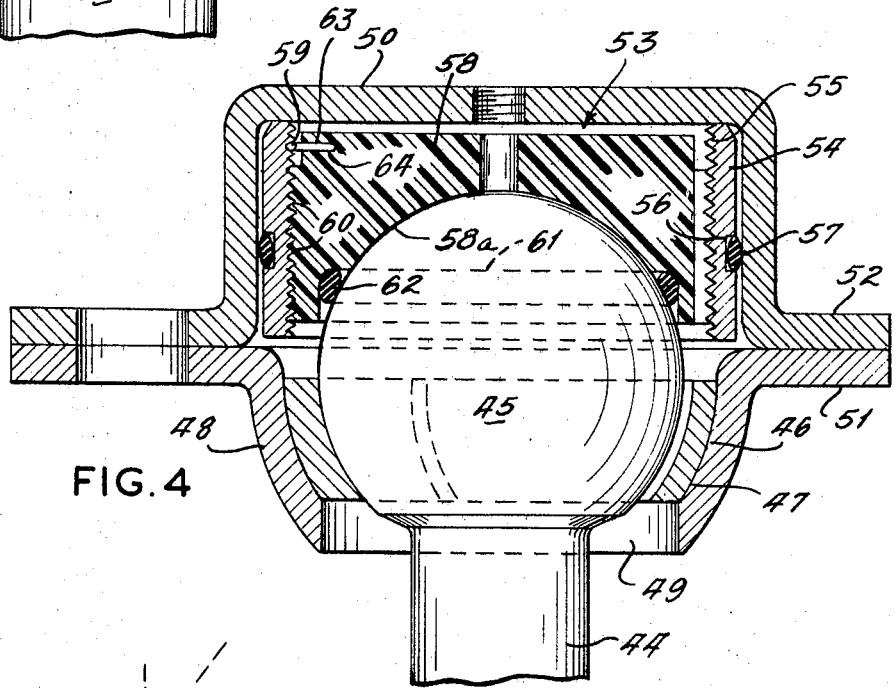
FIG. 4 is a further fragmentary sectional view of still another form of ball joint of the invention.

The ball joint assembly of FIG. 4 is a tension loaded construction in which the stud shank 44 is under tension to hold the stud head 45 down on its bearing element 46 seated in the socket 47 of the housing member 48. The stud is dropped into the bearing element 46 so its shank 44 extends through socket aperture 49. A socket closure 50 is connected to the socket at fingers 51 and 52 by suitable means (not shown).

The space in the closure 50 adjacent the stud head 45 is occupied by a wear take-up and overload protective device 53. The device includes a ring element 54 loose in the closure and provided on its interior with suitable threads 55 and in its exterior with an annular seat 56 to mount an O ring 57. A second element 58 is engaged on the stud head 45 in a spherical seat 58a, and the element is provided with threads 60 to mate with threads 55. The element 58 is formed with a seat 61 to retain an O ring element 62. In addition to the foregoing components, the device 53 includes a ratchet element 63 having its base mounted in a radial socket 64 in the element 58. The element 63 has an outwardly projecting finger 59 bent to ride in the thread groove in element 54 to prevent reverse movement of element 58 in the same manner as described for element 40 in FIGS. 2 and 3. Furthermore, the ball joint of FIG. 4 follows the teaching of the friction reaction curves shown in FIG. 5.

There is shown in FIG. 6 a modified form of one of the elements of the device 25 of FIG. 1, or 25' of FIG. 2, or 53 of FIG. 4. The modification is primarily directed to a ring element 65 having threads or inclined surfaces 66 on its interior and a bottom edge 67 that is provided with lubrication relief spaces 68. The outer surface of the element 65 does not have the O ring element previously described, but does have a plurality of circumferentially spaced resilient pads 69 (four pads, one in each quadrant of a circle), which function in the same manner to allow shifting of the element 65 but hold the element against rotation until a critical load produces enough reaction to overcome the friction of pads 69.

In the preferred forms of the ball joint illustrated herein it is understood that the adjusting devices 25, 25' and 53 operate essentially alike and in accordance with the graph of FIG. 5. Also, the description and drawings disclose the adjusting elements threadedly engaged, but it is understood that inclined surfaces may be utilized. While the description has made reference to certain forms of ball joints to illustrate the principles involved, it is the air hereof to include all possible movable joint devices in the scope of the appended claims.

What is claimed is:

1. In a movable joint device comprising a housing and a study having a headed end operably mounted in said housing for rotation, the improvement of an assembly in said housing adjacent said headed end and operable automatically to take-up wear and adjust for production tolerances and prevent internal overloading, said assembly including: a pair of elements operably engaged on inclined surfaces having relative rotational movement to displace one of said elements axially in a wear take-up direction against said headed end and the other of said elements against said housing, means in said assembly preventing displacement of said one element away from said headed end, said one element having frictional engagement with said headed end to cause rotation of said one element with said headed end and relative to said other element in the wear take-up direction, and other means in said assembly operably engaged between said other of said elements and the housing normally holding said other element by friction reaction against rotation and releasing the latter upon predetermined overloading to rotate with said one element, said other means laterally centering said pair of elements in the housing and allowing for lateral shifting movement thereof bodily within said housing to adjust for production tolerances.

2. The improvement set forth in claim 1 in which said other means is resilient to yield to bodily movement of said pair of elements and retain said friction reaction normally holding said other element against rotation.

3. The improvement set forth in claim 1 in which said inclined surfaces having frictional reaction engagement proportional to applied load thereon, and said frictional engagement of said one element on said headed end is variably proportional to applied load thereon.

4. The improvement set forth in claim 1 in which said pair of elements are rings encircling said headed end, and the frictional engagement between said one ring element and said headed end includes a resilient element yieldable under load therebetween, said resilient element exerting more frictional reaction on said one ring element than is exerted between said inclined surfaces upon wear occurring between said headed end and housing.

5. In a movable joint device: a housing; a stud having a headed end operatively mounted in said housing; and automatically operable means disposed in said housing adjacent said headed end to adjust out wear and compensate for production tolerance variations; said automatic means including: a first element having frictional contact on said headed end to cause rotation of said first element and said frictional contact being variable with loading thereon and said first element having an inclined surface, a second element having an inclined surface engaged with said first element at said inclined surface, said inclined surfaces having frictional contact proportional to the loading thereon and acting to displace said first element axially toward and away from said headed end upon relative rotation between said first and second elements, and said first and second elements being free to move bodily relative to said housing in a lateral direction so as to adjust for production eccentricities in the operative mounting of said headed end in said housing, means in said housing operable on said first element to prevent movement thereof relative to said second element away from adjusting out wear, and other means frictionally engaged between said second element and said housing to normally hold said second element against moving relative to said housing and to laterally center said first and second elements in the housing, said other means being yieldable to allow said first and second elements said freedom of lateral bodily movement relative to said housing.

6. In a movable joint device: a housing; a stud having a headed end operatively mounted in said housing for relative movement in rotation; and a device operatively disposed in said housing to accommodate production tolerances and take-up wear, said device including a first element having frictional engagement on said headed end variably proportional to the load exerted thereby on said stud and rotatable thereby, a second element having along inclined surfaces frictional engagement with said first element which is linearly proportional to the load exerted therebetween, said first and second elements being rotatable relative to each other and together being bodily movable in said housing to adjust the operating position thereof and relieve production tolerance inequities between said housing and headed end, means between said housing and said second element frictionally and yieldably retaining said second element selectively against rotation at one time relative to said housing and at another time relative to said headed end, and laterally centering said first and second elements in said housing and other means in said housing engaged with said first element to stop movement of said first element relative to said second element in a direction to unload said headed end.

7. In a movable joint device: a housing having a substantially cylindrical bore, a stud having a headed end operatively mounted in said housing for relative movement in rotation; and an internal overload preventing and looseness take-up device operatively disposed in said housing bore to encompass a portion of said headed-end, said device including a looseness take-up ring having clearance with said cylindrical bore, a yieldable friction ring disposed in the clearance space between said take-up ring and said cylindrical bore, said looseness take-up ring having threads on its interior surface, a looseness take-up element threadedly engaged with said interior surface threads on said take-up ring and frictionally engaged on said stud headed end to respond to stud rotation for movement therewith and relative to said looseness take-up ring, and means in the movable joint device operative on said looseness take-up device to prevent relative threading movement between said take-up element and said take-up ring upon rotation of said stud in a direction to increase looseness, whereby said take-up ring and element are selectively operable to respond variously to the dominant level of friction therebetween and with said headed end and said cylindrical bore to adjust out looseness upon rotation of said stud headed end relative to said housing, and said ring and element being rotatable together upon predetermined overloading.

References Cited

UNITED STATES PATENTS

| | | | |
|---|---|---|---|
| 3,401,962 | 9/1968 | Scheublein et al. | 287—87 |
| 3,418,011 | 12/1968 | Scheublein et al. | 287—87 |

DAVID J. WILLIAMOWSKY, Primary Examiner

A. V. KUNDRAT, Assistant Examiner